(12) United States Patent
Nikiforov et al.

(10) Patent No.: US 7,484,507 B2
(45) Date of Patent: Feb. 3, 2009

(54) METHOD AND APPARATUS FOR MOUNTING AN ARRAY OF SOLAR COLLECTORS

(75) Inventors: Vladimir Nikiforov, Richmond Hill (CA); Richard Kirkpatrick, Toronto (CA)

(73) Assignee: Yoursolarhome Inc., Vaughn, Ontario (CA)

( * ) Notice: Subject to any disclaimer, the term of this patent is extended or adjusted under 35 U.S.C. 154(b) by 468 days.

(21) Appl. No.: 11/087,750

(22) Filed: Mar. 24, 2005

(65) Prior Publication Data

US 2005/0241633 A1 Nov. 3, 2005

(30) Foreign Application Priority Data

Mar. 24, 2004 (CA) .................................. 2462334

(51) Int. Cl.
*F24J 2/04* (2006.01)

(52) U.S. Cl. ...................... 126/628; 126/629; 126/634; 126/647

(58) Field of Classification Search ................ 126/629, 126/628, 623, 634, 647; 52/173.3, 200, 730.1, 52/57, 730.4, 76, 731.2, 78, 731.3, 639, 800.11, 52/94, 800.12, 74, 653.1, 643, 729.1, 731.1
See application file for complete search history.

(56) References Cited

U.S. PATENT DOCUMENTS

| | | | |
|---|---|---|---|
| 1,283,333 A | 10/1918 | Shaw | |
| 1,326,619 A | 12/1919 | Sweet | |
| 4,132,217 A | 1/1979 | Rom et al. | |
| 4,265,222 A * | 5/1981 | Kapany et al. | 126/632 |
| 4,308,858 A * | 1/1982 | Skillman | 126/570 |
| 4,350,200 A * | 9/1982 | McElwain | 165/48.2 |
| 4,615,381 A | 10/1986 | Maloney | |
| 4,774,932 A | 10/1988 | Hollick | |
| 4,834,338 A | 5/1989 | Davis | |
| 4,899,728 A | 2/1990 | Peter et al. | |
| 5,497,587 A * | 3/1996 | Hirai et al. | 52/173.3 |
| 5,935,343 A | 8/1999 | Hollick | |
| 2002/0117166 A1* | 8/2002 | Okumura | 126/633 |

* cited by examiner

*Primary Examiner*—Alfred Basichas
(74) *Attorney, Agent, or Firm*—Dimock Stratton LLP; Jenna L. Wilson

(57) ABSTRACT

An integrated, modular solar collector comprising an array of solar collection devices, wherein the array of solar collection devices is mounted in a frame providing for air flow between the devices.

11 Claims, 5 Drawing Sheets

METHOD AND APPARATUS FOR MOUNTING AN ARRAY OF SOLAR COLLECTORS

FIELD OF THE INVENTION

This invention generally relates to solar collectors, and specifically to an apparatus and method for assembling and mounting an integrated solar collector on or as a part of a structure.

BACKGROUND OF THE INVENTION

Solar collectors, such as air transpirant (perforated plate) collectors, solar water heating collectors, and photovoltaic (PV) cell arrays are widely known in the art and are used on houses, multiple dwelling units, commercial buildings, and other structures as a means to efficiently provide ventilation, heating and cooling, hot water, and electricity by harnessing solar energy rather than consuming non-renewable or environmentally damaging power sources.

SUMMARY

It is desirable to provide a system and method for efficient mounting solar collectors on a building, allowing for modular construction of an array of solar collectors that may be tailored to the particular requirements, such as heating, ventilation, electrical and hot water supply, for the building serviced by the solar collectors. It is also desirable to provide a mounting structure or frame having a complementary profile for mounting solar collectors that can be used to mount solar collectors on a building in an array that provides for common channels for air flow, piping, and electrical connections, thereby increasing the efficiency of the collectors.

Transpirant collectors having a PV cell-powered fan to induce airflow from the collector to the building interior through a duct are also known in the prior art. It is desirable to provide such a combination transpirant collector that is configured to provide optimal performance of both the PV cell and the collector surface, and furthermore to provide an assemblage of transpirant collectors with interconnected air flow routes utilizing at least a single duct through the exterior wall of the building.

According to a first embodiment, there is provided a modular solar collector for mounting on the exterior face of a building comprising an array of at least two types of solar collection devices, wherein the array is mounted in a frame providing for air flow between the solar collection devices, and a first type of solar collection device is in airflow communication with a second type of solar collection device, wherein the first type of solar collection devices comprises an air transpirant collector, and the second type of solar collection device comprises a panel provided with at least one duct leading to the interior of the building and an intake device for inducing air intake from the exterior of the building to the interior of the building.

In a further embodiment, there is provided a frame component for mounting a solar collector panel, comprising a transverse wall, a first pair of shelves for mounting panels extending from a first surface of the transverse wall, and a complementary pair of shelves extending from a second surface of the transverse wall, such that a channel is defined by fitting the pair of complementary shelves against a pair of complementary shelves provided by a second frame component, and a solar collector panel is adjacent to one of the first shelves.

There is also provided a method for mounting a solar collector panel, comprising the steps of providing a pair of frame components for each edge of the solar collector panel, each frame component comprising a transverse wall, a first pair of shelves for mounting panels extending from a first surface of the transverse wall, each of the first pair of shelves being provided with an adjacent open bore, and a complementary pair of shelves extending from a second surface of the transverse wall, such that a channel is defined by fitting the pair of complementary shelves against a pair of complementary shelves provided by a second frame component; and for each edge of the solar collector panel, fitting one frame component of a pair of frame components to the second frame component of the pair of frame components such that the pairs of complementary shelves provided on the first and second frame components define a channel for air flow, and mounting the edge of the solar collector panel in an open bore adjacent one of the shelves of the first pair of shelves.

BRIEF DESCRIPTION OF THE DRAWINGS

In drawings which illustrate by way of example only a preferred embodiment of the invention.

DESCRIPTION OF THE INVENTION

Figure 6:
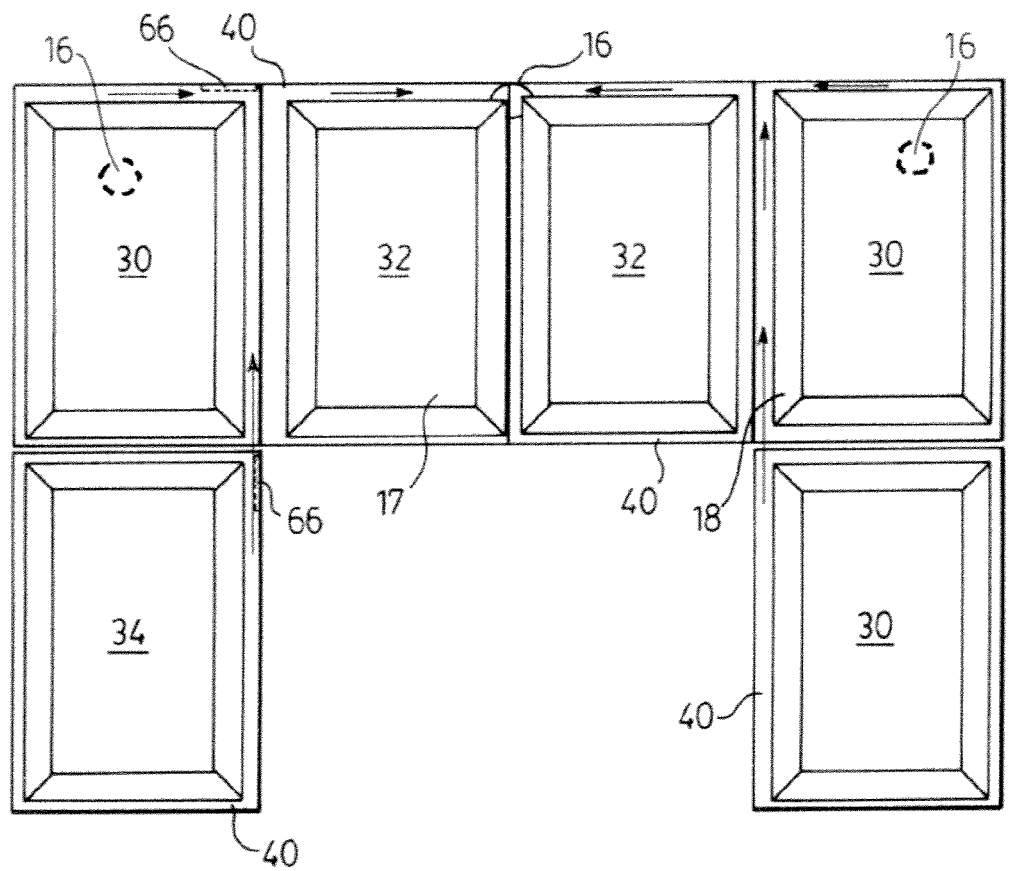
FIG. 6 is a front elevation of a solar collection device array.

An array of solar collectors, as they would be mounted on a wall or roof of a building, or as a part of a building envelope structure, is shown in FIG. 6. The array may be comprised of transpirant collectors 30, solar water heating collectors 32, or arrays of photovoltaic cells 34, or a combination of two or more of the foregoing in accordance with the building's particular heating, ventilation, hot water supply, and electrical load requirements. Preferably, the array has a uniform appearance, being comprised of differently functioning solar collectors of similar appearance, located on different solar exposed and orientated building surfaces, thus optimizing the usage of non-south exposed building surfaces. Exposed building surfaces facing non-optimal directions, for example, can be covered by appropriate solar collectors working for the lower portion of building thermal load. Each collector 30, 32, or 34 is mounted on the building by means of frame segments 40, which are used to frame each collector on each edge and to hide electrical and water collector-to-collector piping connection, as well as reduce thermal losses and provide air flow channels connecting the solar collectors as necessary.

Figure 1:
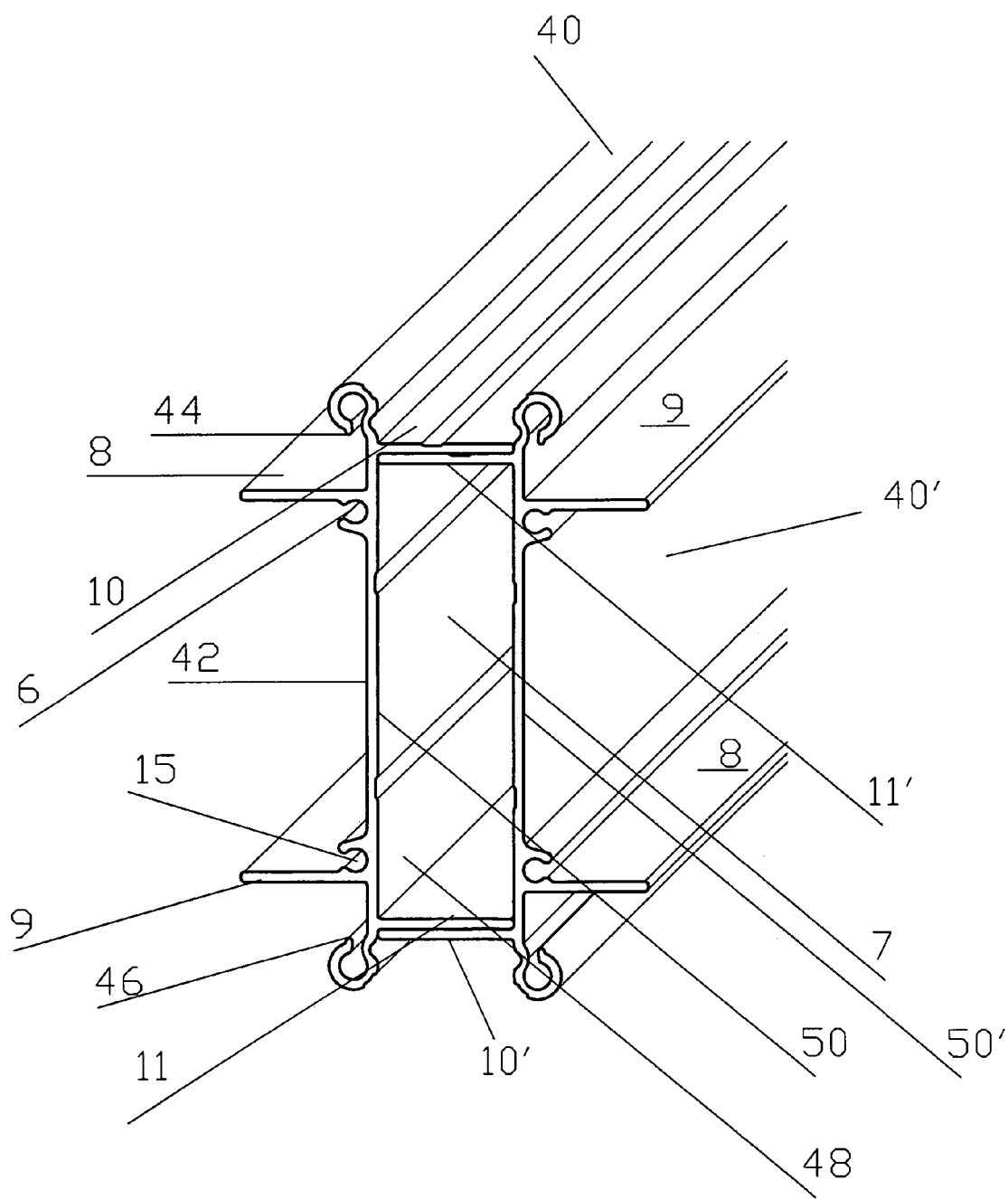
FIG. 1 is a perspective view of a frame for a solar collection device.

The frame 40, as shown in FIG. 1, is preferably formed of composite plastic, ceramic, or extruded aluminum and is cut to the appropriate length to fit along an edge of the solar collector 30, 32, or 34, as described below. The frame 40 comprises a transverse wall 42, provided with slotted beads 44, 46 at either edge of the wall 42. The beads 44, 46 are preferably inclined towards one face of the transverse wall 48, which for convenience is referred to here as the interior face 48. Provided on the interior face 48 are shelves 8, 9, which are disposed at a substantially right angle to the interior face 48, and each an equal distance from its proximal bead 44, 46 respectively. Within the vertex formed between the shelf 8, 9 and the interior face 48, opposite from the proximal bead 44, 46, there is provided an open bore 6, 15, which serves the dual purpose of retaining collector components and providing mounting means such as a screw chase, as described below. Preferably the shelves 8, 9 are of equal depth.

Figure 7:
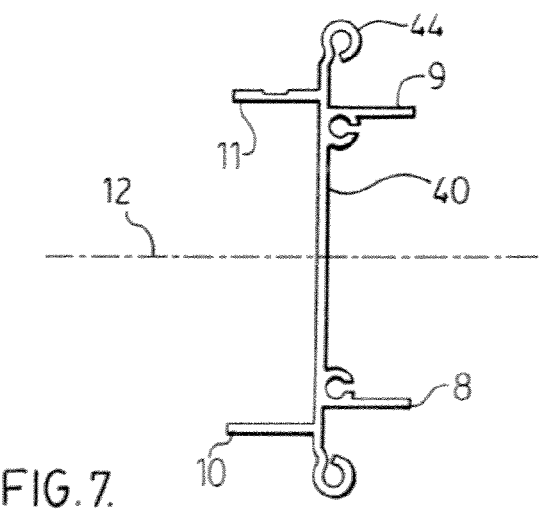
FIG. 7 is a cross-sectional view of a frame component of FIG. 1.

On the opposing face of the transverse wall 42, referred to here as the exterior face 50, are complementary shelves 10, 11, which are of equal depth and positioned substantially at a right angle to the transverse wall 42 such that one of the complementary shelves (for example, shelf 10) is located closer to its proximal edge of the wall 42, than the other complementary shelf (for example, shelf 11) is to its proximal edge of the wall 42. This can be seen in FIG. 1. The locations of the complementary shelves 10, 11 are determined such that when a separate segment of the frame 40' is rotated 180° around its axis 12 as shown in FIG. 7, its complementary shelves 11 and 10 may be aligned and fit together with the complementary shelves 10 and 11 of the frame 40 to create a channel 7, defined by the exterior faces 50, 50' and the shelves 11, 11' (as shown in FIG. 1). Preferably, an airtight channel is provided by placing a sealant such as silicon or adhesive tape between the shelves 10, 11' and 10', 11.

Figure 3:
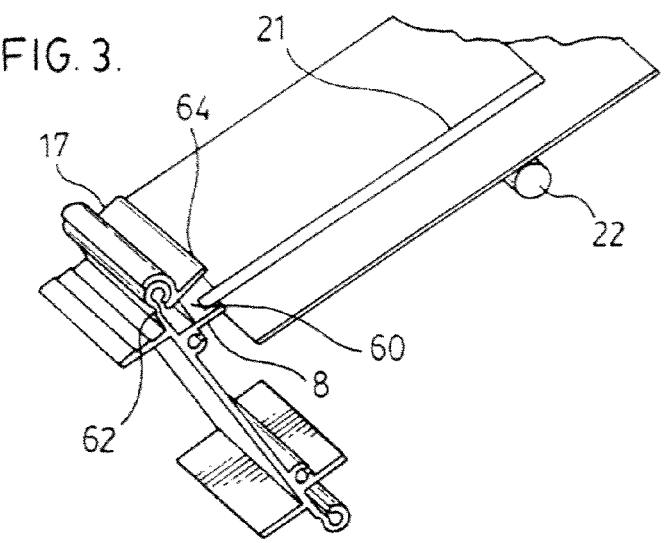
FIG. 3 is a perspective view of a frame segment with glazing mounted thereon.
Figure 8:
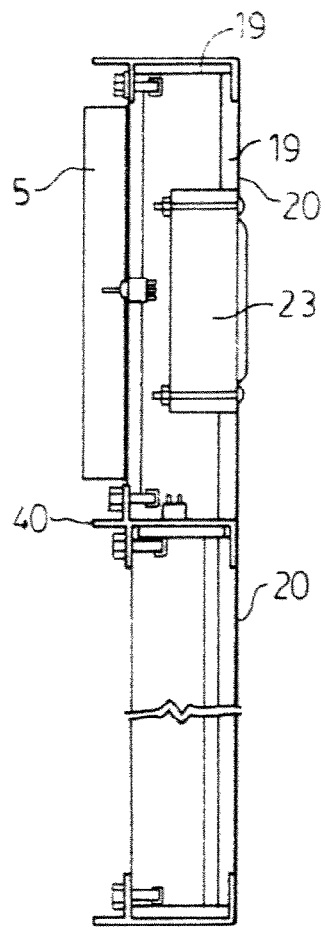
FIG. 8 is a side elevation of a solar collector panel mounted on a frame.
Figure 9:
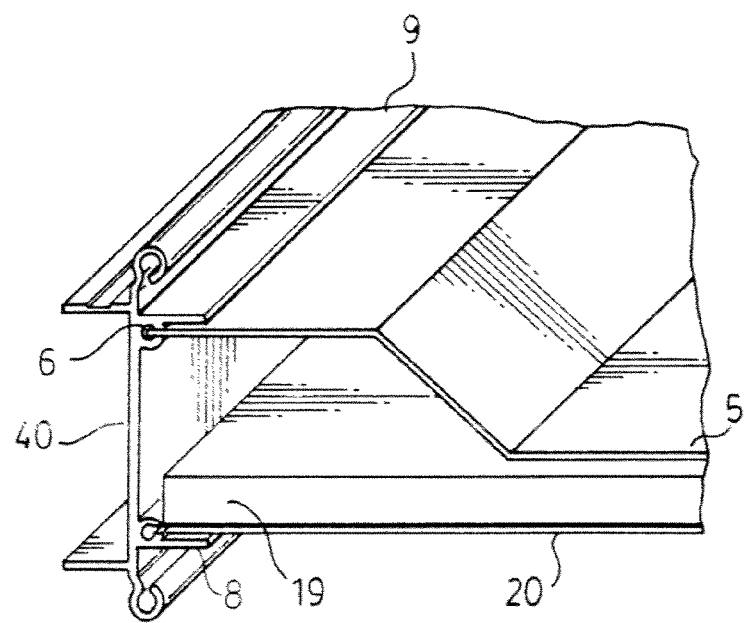
FIG. 9 is a perspective view of a solar collector panel mounted on the frame component of FIG. 7.

Referring to FIGS. 8 and 9, a collector panel 5, which may comprise either a combination solar collector, described below, or a prior art solar collector, may be mounted using frame segments 40 as follows: the edges of a collector panel 5, which typically comprises a plate having an air intake and adapted to absorb heat energy, is slip-fit into the open bores 6. The collector panel 5 preferably comprises a transpirant air absorber, a photovoltaic cell 34, or a liquid collector 32 containing a heat-transfer fluid or water in a conductor 22 as shown in FIG. 3, or another collector panel known in the art. Preferably, the collector panel 5 is fixed in place by means of screws or other fasteners fixed through both the collector panel 5 and the shelf 8. The back plate 20 of the collector is disposed against the side of shelf 9 proximal to the bead 46 and similarly fixed in place. Thermal insulation 19 is mounted behind the back plate 20, or between the back plate 20 and the panel 5, thus defining an airspace between the thermal insulation 19 and the panel 5. Air thus flows into the transpirant collector through its intake, preferably a series of perforations as shown in FIG. 8 and is heated by the panel 5. The thermal insulation 19 and the panel 5 may comprise content phase change material for the purpose of energy storage. In accordance with prior art transpirant collectors, the heated air may be introduced into the building through a duct and by means of a fan disposed in the collector in front of the duct opening.

Similarly, the frame segments 40 may be used for mounting a solar water heating panel as shown in FIG. 3, or a photovoltaic panel. If the collector panel requires protective glazing, the frame 40 provides a means for securely mounting the glazing in place over the collector. Referring to FIG. 3, glazing 21 is wrapped on all edges with a gasket 60 formed of rubber or some other suitably resilient medium. The glazing is fit within the frame 40, resting on the shelf 8 on the surface proximal to the bead 44; to fix the glazing in place, a lock 17 is provided. The lock 17 is preferably extruded from aluminum and is shaped at a first end to snap-fit over the bead 44 with a first detent 62, and at a second end with a second detent 64. To fix the glazing 21 in place against the frame 40, the lock 17 is snap fit around the bead 44 and rotated until the second detent 64 is depressed against the gasket 60, thus securing the gasket 60 against the shelf 8, and the first detent 62 is retained by the slot in the bead 44.

Figure 2:
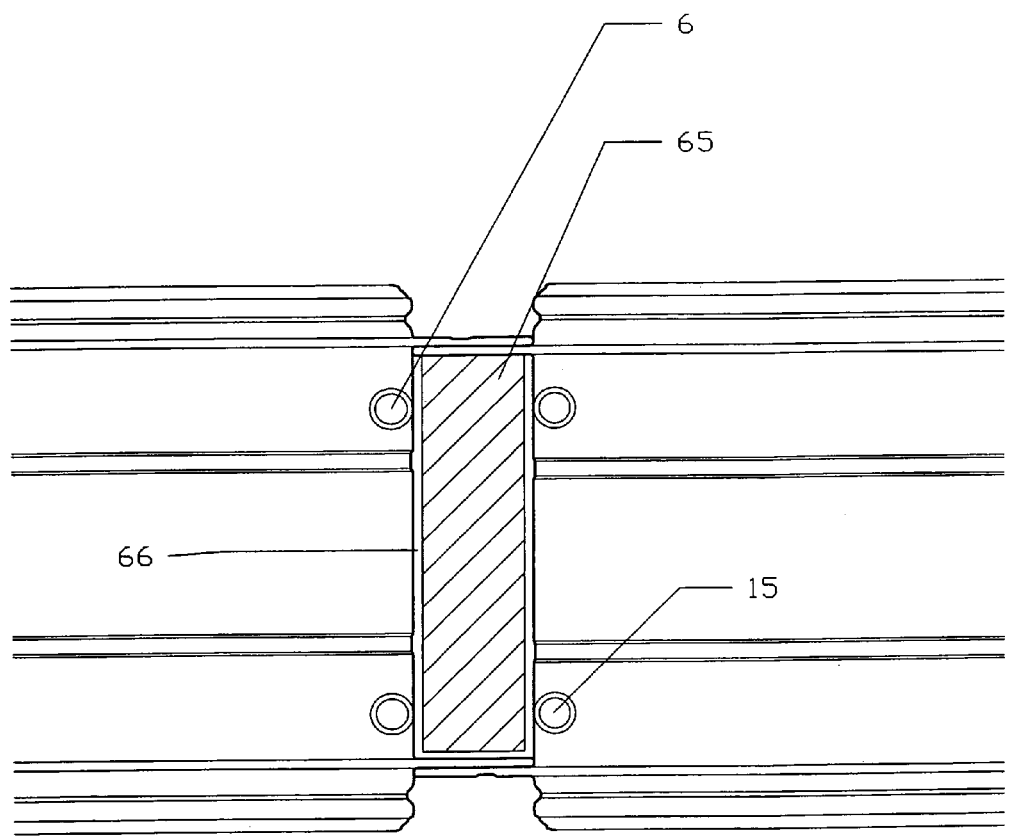
FIG. 2 is a side elevation of two adjacent modules of a solar collection device array.
Figure 4:
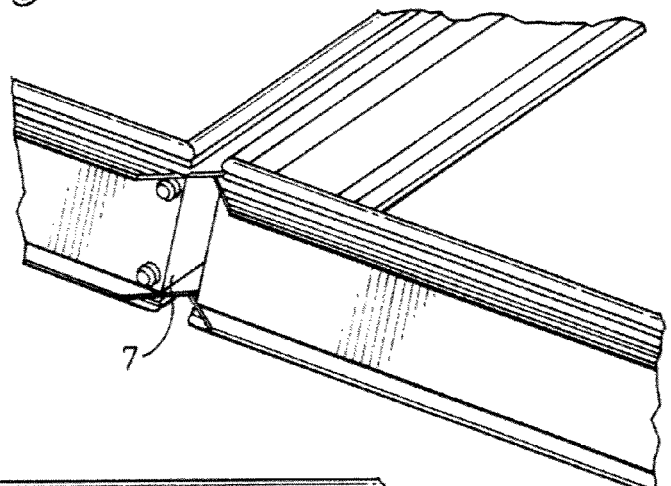
FIG. 4 is a perspective view elevation of the two adjacent modules of FIG. 2.
Figure 5:
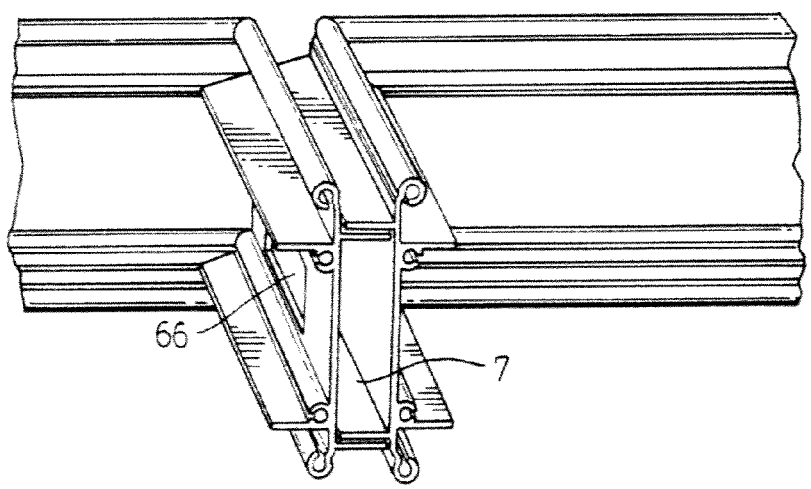
FIG. 5 is a further perspective view of the adjacent modules of FIG. 2.

To fit around the corners of a collector panel, which is typically rectangular, the ends of the frame segments 40 may be bevelled at a 45° angle, and secured against a similarly bevelled frame segment 40 to form a right angle, as shown in FIG. 4. The screws are fixed within the bores 6, 15 of both frame segments 40. As can be seen in FIGS. 4, 5, and 6, by fitting frame segments around each collector panel, and by fitting complementary frame segments to each other as described above, an array of collectors can be provided that is networked by interconnecting channels 7 that allow for air flow between each collector. This arrangement is an improvement over traditionally-mounted solar collectors, which are provided with separate air ducts or piping, as the air flow channels 7 created by the frames 40 do not require additional ductwork that results in heat loss. Closed-cell foam 65, or another resilient material, may be inserted into channel openings or junctions 66 as shown in FIGS. 2, 5, and 6 to redirect air flow from module-to-module or from module-to-channel within the array of collectors, to prevent the flow of air from one collector (module) to another, or from the collector to the outside environment.

Referring to FIGS. 6 and 9, if the collectors within the array are all air transpirant collectors, then the collectors may be assembled in an array as described above, preferably with a bottom to top, left to right module-to-channel opening for air flow as shown in FIG. 6, a single duct 16 leading to the interior of the building with a single fan providing negative pressure inducing air intake from the outside through the collector panel, and into the building. Effectively, the panels in the array provided without their own fans are "dumb" panels with at least one side module-to-channel opening for air circulation; these "dumb" panels are serviced by the single fan in the "master" collector.

Preferably, at least some of the panels provided in the array comprise combination solar collectors provide with a fan powered by high-efficiency photovoltaic (PV) cells during daylight hours. In a combination collector, preferably the area of photovoltaic panel is at least 3.5% of the surface area of collector surface. The front panel of a transpirant air collector preferably has a porosity (open areas vs. gross area) between 0.2% to 1% of the total area. Alternatively, the panel may comprise a flat plate collector preferably covered with a selective paint or cover with an emissivity ratio of less than 0.35.

In such a combination collector, preferably the surface area covered by the PV cells powering the fan is 10-15% of the total exposed surface area of the transpirant collectors serviced by the fan to provide the most efficient use of the installed solar collectors. (If night time ventilation is required, then an additional power source will be required for the fan.) Furthermore, to increase the turbulent air flow within a transpirant collector and to reduce the proportion of laminar air flow, a pulsation device is introduced within the collector. This pulsation device may be mechanical in nature, for example a helical blade mounted between the fan and the collector panel, which is rotated at a rate proportional to the velocity of the fan so as to change the air speed and direction to maintain more efficient turbulent air flow. The pulsation device may also realized by modulation of the current provided to the fan, causing the fan to operate at regularly or irregularly varying speeds by electronic current amplification proportional to the unstable solar radiation on the PV surface.

If the collectors in the array serve different functions, by mounting them on the building in accordance with the present invention, an aesthetically uniform and attractive appearance may be achieved. If an array is designed to cover an entire exterior surface of a building, or it is intended to substitute as a wall of a building, if desired some panels of the array may be substituted with decorative glazing or other wall or roof finishing treatments.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A modular solar collector for mounting on the exterior face of a building comprising:
    an array of at least two types of solar collection devices, wherein the array is mounted in a frame providing for air flow between the solar collection devices, and a first type of solar collection device is in airflow communication with a second type of solar collection device;
    wherein the first type of solar collection devices comprises an air transpirant collector, and the second type of solar collection device comprises a panel provided with at least one duct leading to the interior of the building and an intake device for inducing air intake from the exterior of the building to the interior of the building.

2. The modular solar collector of claim 1, wherein the intake device is a fan.

3. The modular solar collector of claim 2, wherein the fan is powered by a photovoltaic cell provided on the second type of solar collection device.

4. The modular solar collector of claim 3, wherein the ratio of the surface area of the photovoltaic cell provided on the second type of solar collection device to the total surface area of the second type of solar collection device is at least 3.5:100.

5. The modular solar collector of claim 1, wherein the at least one type of solar collection device comprises a combination solar collector panel, said combination solar collector panel comprising:
    a panel surface comprising a transpirant collector;
    at least one duct leading to the interior of the building;
    an intake device for inducing air intake from the exterior of the building to the interior of the building;
    a photovoltaic cell for powering the intake device, wherein the ratio of the surface area of the photovoltaic cell to the surface area comprising a transpirant collector is at least 3.5:96.5.

6. The modular solar collector of claim 1, wherein the frame comprises frame components, each said component comprising:
    a transverse wall;
    a first pair of shelves for mounting panels extending from a first surface of the transverse wall; and
    a complementary pair of shelves extending from a second surface of the transverse wall;
    such that a channel for air flow is defined by fitting the pair of complementary shelves against a pair of complementary shelves provided by a second frame component, and a solar collection device is mountable against one of the shelves or complementary shelves;
    wherein the frame comprises a plurality of frame components fitted together to define channels for air flow between the solar collection devices.

7. The modular solar collector of claim 6, wherein at least one opening is defined in the frame components to permit air flow between adjacent solar collection devices.

8. The modular solar collector of claim 6, wherein each of the at least two types of solar collection devices is provided with a plurality of edges, and the frame comprises at least one pair of frame components fitted together to define the channel for air flow
    and wherein at least one edge of each of the at least two types of solar collection devices is mounted against one of the shelves or complementary shelves of the at least one pair of frame components.

9. The modular solar collector of claim 1, wherein the frame comprises at least one pair of frame components, and wherein air flow between the solar collection devices is provided by a channel for air flow defined by each pair of frame components when fitted together.

10. The modular solar collector of claim 9, wherein each of the frame components comprises:
    a transverse wall;
    a first pair of shelves for mounting panels extending from a first surface of the transverse wall; and
    a complementary pair of shelves extending from a second surface of the transverse wall;
    such that the channel for air flow is defined by fitting the pair of complementary shelves of a first of the pair of frame components against a pair of complementary shelves of a second of the pair of frame components, and a solar collection device is mountable against one of the shelves or complementary shelves.

11. The modular solar collector of claim 10, wherein fitting the pair of complementary shelves of the first of the pair of frame components against the pair of complementary shelves of the second of the pair of frame components comprises aligning one of the pair of frame components such that it is substantially rotated 180° from the alignment of the other of the pair of frame components.

* * * * *